(12) United States Patent
DeKoning et al.

(10) Patent No.: US 6,412,045 B1
(45) Date of Patent: Jun. 25, 2002

(54) METHOD FOR TRANSFERRING DATA FROM A HOST COMPUTER TO A STORAGE MEDIA USING SELECTABLE CACHING STRATEGIES

(75) Inventors: Rodney A. DeKoning; Donald R. Humlicek; Max L. Johnson; Curtis W. Rink, all of Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 08/447,594

(22) Filed: May 23, 1995

(51) Int. Cl.[7] .......................... G06F 12/00; G06F 13/00
(52) U.S. Cl. ........................ 711/135; 711/133
(58) Field of Search ................. 395/462, 465, 395/440, 444; 711/135, 133, 134, 113, 118, 138, 143

(56) References Cited

U.S. PATENT DOCUMENTS

| | | | |
|---|---|---|---|
| 4,530,055 A | | 7/1985 | Hamstra et al. ............ 364/200 |
| 5,025,366 A | * | 6/1991 | Baror ........................ 395/455 |
| 5,353,430 A | * | 10/1994 | Lautzenheiser ............. 395/444 |
| 5,506,967 A | * | 4/1996 | Barajas et al. .............. 395/250 |

FOREIGN PATENT DOCUMENTS

| WO | 9215933 | 9/1992 | |
|---|---|---|---|
| WO | WO 92/15933 | 9/1992 | ..................... 1/30 |

OTHER PUBLICATIONS

The Architecture of a Fault–Tolerant Cached RAID Controller; Jai Menon and Jim Cortney; May 16, 1993; pp. 76–86.

* cited by examiner

*Primary Examiner*—Hong Kim
(74) *Attorney, Agent, or Firm*—Maginot, Moore & Bowman

(57) ABSTRACT

An apparatus and method is disclosed which enables a host computer to adjust the caching strategy used for writing its write request data to storage media during execution of various software applications. The method includes the step of generating a caching-flushing parameter in the host computer. The cache flushing parameter is then transferred from the host computer to a controller which has a cache memory. Thereafter, a quantity of write request data is written from the cache memory to a storage medium in accordance with the cache-flushing parameter.

18 Claims, 3 Drawing Sheets

FIG. 2

| BIT / BYTE | 7 | 6 | 5 | 4 | 3 | 2 | 1 | 0 | |
|---|---|---|---|---|---|---|---|---|---|
| 0 | PS | Rsvd | \multicolumn{6}{c}{Page Code (0 x 3E)} | | | | | | | 46 |
| 1 | \multicolumn{8}{c}{Page Length (0 x 2E)} | | | | | | | | | 48 |
| 2 | \multicolumn{5}{c}{Reserved} | CWOB | FWT | CME | 50 |
| 3 | ABPR | BPR | ACMA | CMA | ABOK | BOK | RCA | WCA | 52 |
| 4 | \multicolumn{8}{c}{Reserved} | | | | | | | | | 54 |
| 5 | \multicolumn{8}{c}{Reserved} | | | | | | | | | 56 |
| 6 | \multicolumn{8}{c}{Read Caching Algorithm} | | | | | | | | | 68 |
| 7 | \multicolumn{8}{c}{Reserved} | | | | | | | | | |
| 8 | \multicolumn{8}{c}{Write Caching Algorithm} | | | | | | | | | 70 |
| 9 | \multicolumn{8}{c}{Reserved} | | | | | | | | | |
| 10 | \multicolumn{8}{c}{Cache Flush Algorithm} | | | | | | | | | 72 |
| 11 | \multicolumn{4}{c}{Reserved} | \multicolumn{4}{c}{Cache Flush Modifier} | | | | | | | | | 74 |
| 12 | \multicolumn{8}{c}{Two Minute Warning Flush Algorithm} | | | | | | | | | 76 |
| 13 | \multicolumn{4}{c}{Reserved} | \multicolumn{4}{c}{Two Minute Warn. Flush Modifier} | | | | | | | | | 78 |
| 14 | \multicolumn{8}{c}{Reserved} | | | | | | | | | |
| 15 | \multicolumn{8}{c}{Reserved} | | | | | | | | | |
| 16 | \multicolumn{8}{c}{Demand Flush Threshold (Percentage)} | | | | | | | | | 80 |
| 17 | \multicolumn{8}{c}{Demand Flush Amount (Percentage)} | | | | | | | | | 82 |
| 63 | | | | | | | | | |

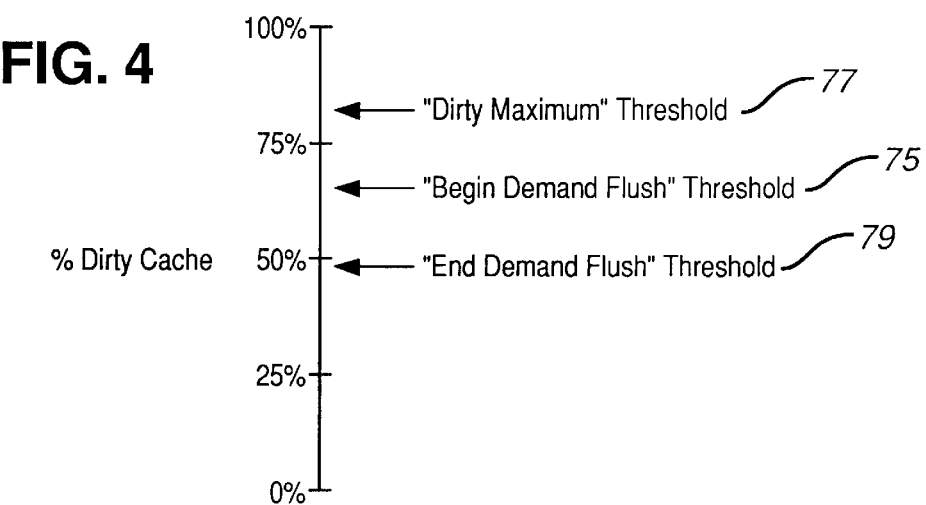

FIG. 4

% Dirty Cache

- "Dirty Maximum" Threshold — 77
- "Begin Demand Flush" Threshold — 75
- "End Demand Flush" Threshold — 79

METHOD FOR TRANSFERRING DATA FROM A HOST COMPUTER TO A STORAGE MEDIA USING SELECTABLE CACHING STRATEGIES

BACKGROUND OF THE INVENTION

The present invention relates generally to a method for transferring data, and more particularly to a method for transferring data from a host computer to a storage media using selectable caching strategies.

Write-back caching is an exemplary environment for transferring data from an initiator device to a target device. Write-back caching refers to a method of executing write requests where an initiator device such as a host computer transfers write request data to a target device such as a caching disk array controller which then transfers the write request data to storage media. Depending upon the particular write-back caching strategy being implemented by the controller, the write request data can either be written immediately to the storage media, or the write request data can be temporarily stored in a cache memory as unwritten or "dirty data" and then "flushed" or written to the storage media at some later point in time. In both cases, the controller sends back status information to the host computer indicating that the write request is complete so that the host computer can continue executing a software application. What is meant herein by the use of the term "dirty data" is data that is located in cache memory which is not yet been written to storage media. To provide meaning to the following terms "flush", "flushed" or "flushing" which are used herein, it should be appreciated that the act of "flushing" data means writing dirty data to storage media.

The performance of a host computer when executing a certain software application is dependent, at least in part, upon the particular caching strategies that are implemented by the caching disk array controller. More specifically, the performance of the host computer can be optimized by implementing the most appropriate caching strategies for the particular software application being executed.

With regard to write-back caching, the host computer may experience optimal performance when executing a first software application with write request data written immediately to storage media, while the host computer may experience optimal performance when executing a second software application with write request data stored in cache memory for as long as possible before it is written to storage media. Further, the host computer may experience optimal performance when executing a third software application with write request data stored in cache memory for a particular time interval, or until a particular amount of write request data has been stored in the cache, before it is written to storage media.

Heretofore, a host computer was unable to adjust or tune the caching strategy used for writing its write request data to storage media during execution of various software applications. It would therefore be desirable to provide a method in which the host computer would adjust the caching strategy used for writing its write request data to storage media during execution of various software applications so that the host computer could optimize its performance during execution of the various software applications.

SUMMARY OF THE INVENTION

In accordance with one embodiment of the present invention, there is provided a method for transferring data to a storage medium. The method includes the steps of (1) providing a controller having a cache memory, (2) generating a cache-flushing parameter in the host computer, (3) transferring the cache-flushing parameter from the host computer to the controller, and (4) writing a quantity of write request data from the cache memory of the controller to the storage medium in accordance with the cache-flushing parameter.

Pursuant to another embodiment of the present invention, there is provided a method of transferring data from a host computer to a storage media. The method includes the steps of (1) sending a first caching parameter which defines a first caching strategy to a controller, (2) transferring a first quantity of data from the host computer to the storage media based on the first caching parameter, (3) sending a second caching parameter which defines a second caching strategy to the controller, and (4) transferring a second quantity of data from the host computer to the storage media based on the second caching parameter.

Pursuant to yet another embodiment of the present invention, there is provided a method for transferring data to a storage device. The method includes the steps of (1) updating a cache-flushing parameter associated with a cache memory, and (2) flushing the cache memory to the storage device in accordance with the cache flushing parameter after the updating step.

Pursuant to still yet another embodiment of the present invention, there is provided a method for controlling cache flushing characteristics of a storage device, with the storage device having a controller which includes a cache memory. The method includes the steps of (1) sending a cache-flushing parameter to the controller, and (2) flushing the cache memory of the controller in accordance with the cache-flushing parameter.

It is therefore an object of the present invention to provide a new and useful method for dynamically changing a cache flushing algorithm.

It is another object of the present invention to provide a new and useful method of changing cache flushing characteristics through host selectable parameters.

It is a further object of the present invention to provide a new and useful method for varying how much of a cache memory will be flushed at one time using a host selectable parameter.

It is yet another object of this invention to provide a new and useful method for varying a time interval for writing unwritten write request data to a storage media.

The above and other objects, features, and advantages of the present invention will become apparent from the following description and the attached drawings.

BRIEF DESCRIPTION OF THE DRAWINGS

FIG. 2 illustrates a memory buffer format with fields containing host-selectable parameters;

FIG. 4 is a graph illustrating a begin on-demand flush threshold, end on-demand flush threshold and a dirty maximum threshold which define the operating parameters for an exemplary on-demand cache flushing operation.

DETAILED DESCRIPTION OF THE PREFERRED EMBODIMENT

Figure 1:
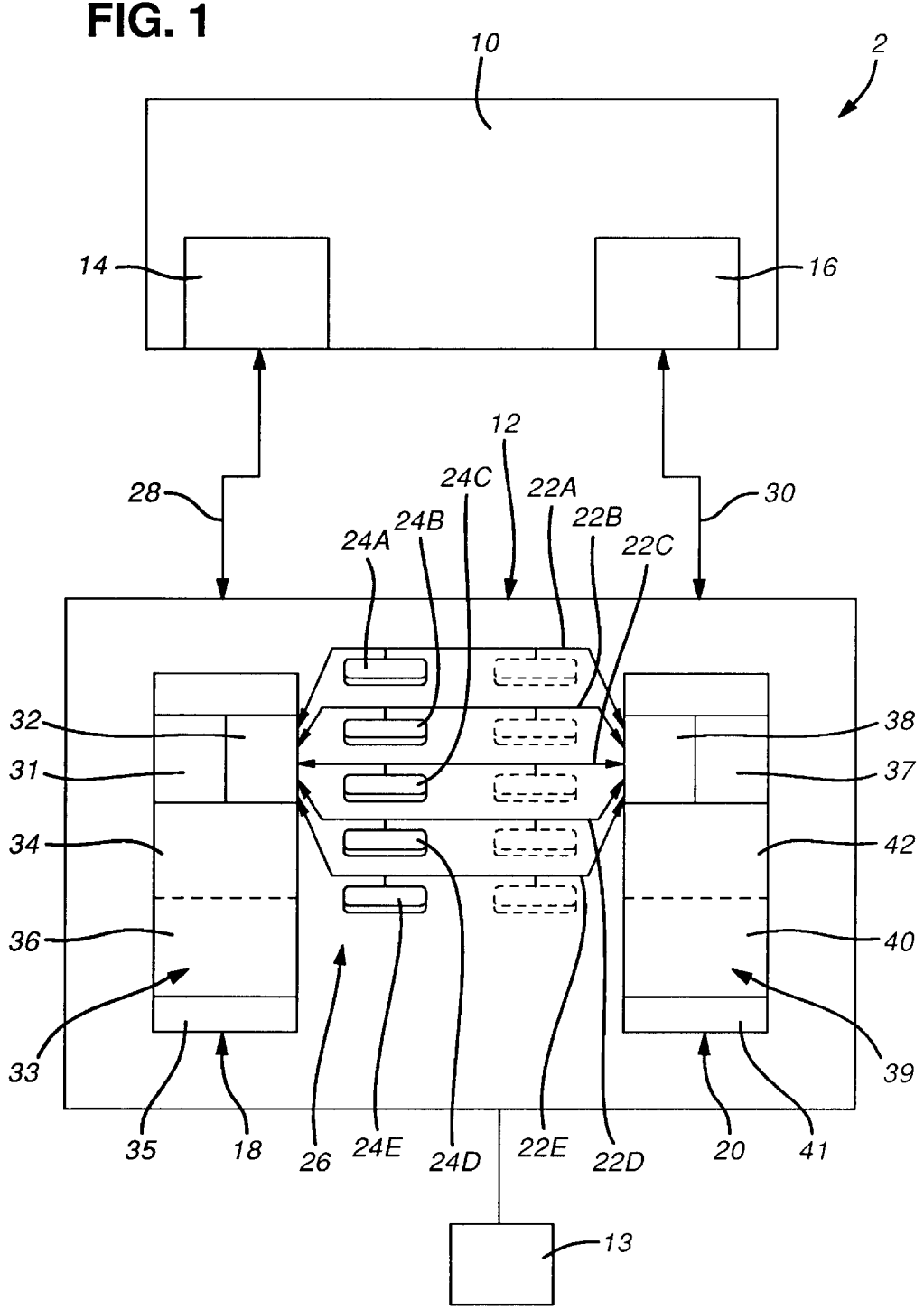
FIG. 1 is a block diagram of a host computer and a multi-controller disk array apparatus which is responsive to host-selectable parameters for changing cache flushing strategies in accordance with the method of the present invention.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a computer system 2 comprising a host computer 10, a peripheral disk drive apparatus 12 connected to the host computer 10, and a sub-system uninterruptable power supply (UPS) 13 associated with the disk drive apparatus 12. The host computer 10 includes a first host adapter 14 and a second host adapter 16 both of which function to interface the host computer 10 to various peripheral devices such as the disk drive apparatus 12. The sub-system UPS 13 only provides power to the disk drive apparatus 12.

The disk drive apparatus 12 includes a first caching disk array controller 18, a second caching disk array controller 20, a plurality of back-end buses or channels 22A–22E, and at least one storage medium 24 associated with each channel 22A–22E. In the described embodiment, the channels 22A–22E are SCSI channels which connect the first controller 18 to the second controller 20. SCSI is an acronym for a Small Computer System Interface which defines a communications protocol standard for input/output devices. The first version of the standard, SCSI-1, is described in ANSI X3.131-1986 and is incorporated herein by reference. The SCSI-1 specification has been upgraded with an expanded interface referred to as SCSI-2. The SCSI-2 specification is described in ANSI Document No. X3.131-1994 which is also incorporated herein by reference.

In the described embodiment, there are five disks 24A–24E which cooperate to form a one-column disk array 26, and which are individually connected to the controllers 18, 20 via the buses 22A–22E, respectively. The disk array 26 incorporates a design termed "Redundant Array of Inexpensive Disks" (RAID). Five levels of RAID design, termed RAID-1 through RAID-5, are known in the art and are described in the publication titled "A Case for Redundant Arrays of Inexpensive Disks (RAID)" by David A. Patterson, Garth Gibson and Randy H. Katz; University of California Report No. UCB/CSD 87/391, December 1987, which is incorporated herein by reference. It should be appreciated that the disk array 26 can include additional columns of disks connected to the respective buses 22. For example, a 5 by 6 disk array comprising thirty (30) disk drives can be formed by connecting 5 additional disks to each bus 22A–22E, respectively.

The host computer 10, and more particularly, the host adapters 14, 16 are connected to the respective disk array controllers 18, 20 via separate buses or channels such as host SCSI buses 28 and 30. The first controller 18 includes a data processor such as a conventional microprocessor 31, an input/output processor or secondary processor 32, a cache memory 33, and a cache battery 35. The cache memory 33 can be partitioned into at least two separate areas, a primary cache memory area 34. and an alternate cache memory area 36. Likewise, the second controller 20 includes a data processor such as a conventional microprocessor 37, an input/output processor or secondary processor 38, a cache memory 39 and a cache battery 41. The cache memory 39 is partitioned into at least two separate areas, a primary cache memory area 40 and an alternate cache memory area 42. The cache batteries 35, 41 exclusively power the cache memories 33, 39, respectively, in the event of a power failure or interruption to prevent the loss of data stored in the cache memories 33, 39.

The input/output processors 32, 38 execute ASIC-specific (Application Specific Integrated Circuit) instructions independent from controller firmware which is executed by the respective microprocessors 31, 27. One example of a suitable input/output processor is the SCSI Input/Output Processor (SIOP) 53C825 chip manufactured by Symbios Logic Inc. of Fort Collins, Colo. The 53C825 input/output processor executes SCRIPTS instructions which are an ASIC-specific instruction set specifically designed for controlling the 53C8XX family of Symbios Logic Inc. products.

The controllers 18, 20 can operate one of two modes, passive-active or dual-active. In the dual-active mode of operation, both controllers 18, 20 have portions of their respective cache memories 33, 39 allocated for exclusive use by the other controller. Thus, in the dual-active mode, both controllers 18, 20 function as a primary controller and an alternate controller. More specifically, the primary cache memory area 34 is assigned to controller 18 for use during cache read/write requests from the host computer 10, and the alternate cache memory area 36 is assigned to controller 20 for use in mirroring write request data which is stored in the primary cache memory area 40 of controller 20. Controller 20 is responsible for managing the write request data that it mirrors or stores in the alternate cache memory area 36.

Likewise, the primary cache memory area 40 is assigned to controller 20 for use during cache read/write requests from the host computer 10, and the alternate cache memory area 42 is assigned to controller 18 for use in mirroring write request data which is stored in the primary cache memory area 34 of controller 18. Controller 18 is responsible for managing the write request data that it mirrors into the alternate cache memory area 42.

The alternate cache memory areas 42, 36 are allocated to the respective controllers 18, 20 during the system configuration phase of start-up operations for the computer system 2. It should be appreciated that the alternate cache memory area 42 is assigned the same corresponding memory addresses as assigned to the primary cache memory area 34, and that the alternate cache memory area 36 is assigned the same corresponding memory addresses as assigned to the primary cache memory area 40 thus simplifying mirroring operations by avoiding the need for virtual memory mapping operations.

In the passive-active mode of operation, one of the controllers, such as controller 18, functions as a primary controller which receives read/write requests from the host computer 10 while the other controller, controller 20, functions as an alternate controller which provides cache memory for mirroring the write request data under the direction of the primary controller 18 as described above with regard to the dual-active mode of operation.

It should be appreciated that the primary cache memory area 34 does not have to be the same size as the alternate cache memory area 42, and that the primary cache memory area 40 does not have to be the same size as the alternate cache memory area 36. By way of example, the alternate cache memory area 36 has to only be large enough to handle all of the mirrored write request data that controller 20 wants to store. At any given time, the primary cache memory area 40, and similarly, the primary cache memory area 34, has X % of read cache, Y % of write cache and Z % of unused memory allocated thereto, where X+Y+Z=100% of the primary cache memory area 40. If the maximum amount of write request data (Y % of write cache) that can be stored in the primary cache memory area 40 is less than 100% of the primary cache memory area 40, then the alternate cache memory area 36 can be smaller than the primary cache memory area 40. That is, the alternate cache memory area 36 need only be as large as the amount of the primary cache memory area 40 allocated for write caching.

The present invention provides for adjustment of the caching strategies implemented by the controllers 18, 20. For ease of description, further reference will be limited to adjustment of the caching strategies implemented by controller 18 only. However, it is to be understood that adjustment of the caching strategies implemented by controller 20 occur in an analogous manner.

Referring now to FIG. 2 there is shown an exemplary memory buffer 44 with a plurality of fields containing host-selectable caching parameters that control the operation of the controller 18 in accordance with the method of the present invention. The memory buffer 44 is maintained in the controller 18 for receiving data and instructions from the host computer 10 the form of a vendor-unique caching page. When the host computer desires to change the way that caching operations are being implement by the controller 18, the host computer 10 updates the memory buffer 44 via a mode select page command followed by the vendor-unique caching page directed to the memory buffer 44. In the embodiment being described, the host computer 10 transfers the 63-byte vendor-unique caching page in the form of a data stream that contains the host-selectable parameters to the memory buffer 44. The parameters are then used by the controller 18 to vary or modify the caching strategy or strategies implemented in the controller 18. Note that a portion of the 63-byte vendor-unique caching page that is transferred by the host computer 10 may be reserved for other purposes.

The controller 18 executes the mode select page command sent from the host computer 10 on an advisory basis. That is, the controller 18 takes into consideration not only the mode select page command from the host computer 10, but also other events that are occurring within the computer system 2 that may require the controller 18 to perform a task differently from that requested by the host computer 10. For instance, the controller 18 may have to flush the primary cache memory area 34 at an interval different from that specified by the host computer 10 in the memory buffer 44. The memory buffer 44 can also be used by the host computer 10 to retrieve configuration information from the controller 18 by issuing a mode sense page command which causes the contents of the memory buffer 44 to be read into the host computer 10.

The fields within the memory buffer 44 are divided into three groups, namely, a cache control flag group, a cache operating state flag group, and a cache control field group. The cache control flag group contains the following one-bit cache control flags: allow write caching without batteries (CWOB) flag 46, force write-through on two-minute warning (FWT) flag 48, and cache mirror enable (CME) flag 50.

If the CWOB flag 46 (allow write caching without batteries flag) is set to one (1), the controller 18 will permit write caching operations without the presence of the cache batteries 35, 41. The CWOB flag allows the use of write caching with a volatile cache memory such as the cache memory 33 and the uninterruptable power supply (UPS) 13.

The UPS 13 provides battery back-up to the disk drive apparatus 12 including the cache memories 33, 39 in the event of a power failure to the controller 18. The value specified by the CWOB flag 46 is maintained on a logical unit basis. The term "logical unit" is used herein to mean a group of one or more disks 24 that the host computer 10 sees as a single unit. Each logical unit comprises a plurality of 512 byte sectors or blocks. A RAID controller, such as controller 18, can define multiple logical units, wherein each logical unit can be configured to implement a different RAID level.

The FVVT flag 48 (force write-through on two-minute warning flag) provides control over the actions taken by the controller 18 if a UPS two-minute warning is received while write-back caching is enabled on a logical unit. That is, if battery power in a system-wide UPS (not shown) is about to be depleted, then a UPS two-minute warning will be issued. If a logical unit has write-back caching disabled, the FWT flag 48 has no effect on the logical unit.

The default for the FWT flag 48 is off, i.e. set to zero (0), indicating that the controller 18 will not force write-back caching to a disabled state on the logical unit when a UPS two-minute warning is received. Thus, write-back caching operations will continue on the logical unit as long as write request commands are received from the host computer 10. The controller 18 provides the highest possible write throughput from the host computer 10 with the FWT flag 48 is set to zero (0). This action is desirable for a host computer that does not have battery back-up for its internal memory and needs to flush its memory as quick as possible before the system-wide UPS is depleted. Thus, by continuing to use write-back caching after a UPS two-minute warning is received, there is a better chance of flushing the host computer's memory before battery power in the system-wide UPS is depleted.

If the FWT flag 48 is turned on, i.e. set to one (1), the controller 18 will disable write-back caching and flush any dirty data in the cache memory 33 to the storage media. This action is desirable for a host computer that does have its own UPS (not shown) or battery-backed memory (not shown), and thus does not have an urgent need to ensure that all data in its memory has been written before the system-wide UPS battery is depleted. The controller 18 flushes the dirty data to storage media so that the sub-system UPS 13 will not have to be expended to store any dirty data when the system-wide UPS battery is depleted.

The FWr flag 48 only controls enabling or disabling the cache memory 33 and will not affect read caching operations. Cache flushing operations can also be controlled by using a TMW Flush Modifier field 78 discussed further below.

The CME flag 50 (cache mirror enable flag) is used to control the use of the cache mirroring capabilities in redundant controller configurations. If the CME flag 50 is set to one (1), cache mirroring is enabled and a copy of the write request data is placed in the alternate cache memory area 42 of the alternate controller 20 as previously described. If the CME flag 50 is turned off, the controller 18 will maintain a copy of the write request data from the host computer 10 in its own cache memory 33, but not copy the data to the alternate controller 20.

The CME flag 50 is maintained for each logical unit and thus the cache mirroring feature can be enabled or disabled for each individual logical unit. If write-back caching is disabled in a standard SCSI caching mode page, then the CME flag 50 and the other write-back caching parameters in the vendor-unique caching page are ignored. The standard SCSI caching mode page provides a single bit for enabling and disabling write-back caching in addition to limited algorithm control. However, the standard SCSI caching mode page does not provide for the same level of adjustment or tuneablity as provided for in the vendor-unique caching page of the present invention.

The cache operating state flag group contains the following one-bit cache operating state flags: write cache active (WCA) flag 52, read cache active (RCA) flag 54, batteries OK (BOK) flag 56, alternate controller batteries OK (ABOK) flag 58, cache mirroring active (CMA) flag 60, alternate controller cache mirroring active (ACMA) flag 62, batteries present (BPR) flag 64 and alternate controller batteries present (ABPR) flag 66. The cache operating state flags are returned by the controller 18 on a mode sense command. The mode sense command permits the host computer 10 to determine the current configuration of a SCSI target device, such as controller 18. The cache operating state flags are ignored if set on a mode select command. The mode select command permits the host computer 10 to configure a SCSI target device, such as the controller 18.

When the WCA flag 52 (write cache active flag) is set to one (1), the controller 18 uses write-back caching to service write requests from the host computer 10. When the WCA flag 52 is set to zero (0), write-back caching has either been disabled by the host computer 10 or the controller 18 has temporarily de-activated the feature. The WCA flag 52 does not indicate if write back data is present in the cache memory 33.

When the RCA flag 54 (read cache active flag) is set to one (1), the controller 18 uses read caching. When the RCA flag 54 is set to zero (0), read caching has either been disabled by the host computer 10, or the controller 18 has temporarily de-activated the RCA feature. The RCA flag 54 does not indicate if cached data or parity is present in the cache 33.

When the BOK flag 56 (batteries OK flag) is set to one (1), the cache battery 35 in controller 18 is operational. If the BOK flag 56 is set to zero (0), the battery power to the cache memory 33 has failed or there is no battery 35 present. If the battery 35 is not present, the batteries present flag 64 will be off, i.e. set to zero (0).

When the ABOK flag 58 (alternate controller batteries OK flag) is set to one (1), the cache battery 41 on the alternate controller 20 is operational. If the ABOK flag 58 is set to zero (0), the battery power to the cache memory 39 has failed or there is no battery 41 present. If the battery 41 is not present, the alternate controller batteries present flag 66 will be off, i.e. set to zero (0).

When the CMA flag 60 (cache mirroring active flag) is set to one (1), the controller 18 mirrors write request data stored in the primary cache memory area 34 to the alternate cache memory area 42 of controller 20. When the ACMA flag 62 (alternate controller cache mirroring active flag) is set to a one (1), the alternate controller 20 mirrors write request data stored in the primary cache memory area 40 to the alternate cache memory area 36 of primary controller 18.

If the BPR flag 64 (batteries present flag) is set to one (1), then controller 18 has detected that cache battery 35 is available to power the cache memory 33 in the event of a power interruption. If the ABPR flag 66 (alternate controller batteries present flag) is set to one (1), the alternate controller 20 has detected that the battery 41 is available to power the cache memory 39 in the event of a power interruption.

The cache control field group contains the following cache control fields: read caching algorithm field 68, write caching algorithm field 70, cache flush algorithm field 72, cache flush modifier field 74, two-minute warning flush algorithm field 76, two-minute warning flush modifier field 78, demand flush threshold field 80, and the demand flush account field 82.

The parameter specified in the read caching algorithm field 68 is used to select a particular read caching algorithm. Likewise, the parameter specified in the write caching algorithm field 70 is used to select a particular write caching algorithm. Further, the parameter specified in the cache flush algorithm field 72 is used to select a particular cache flushing algorithm.

The parameter specified in the cache flush modifier field 74 is used to vary cache flushing characteristics such as a flushing schedule for a cache flushing algorithm implemented by the controller 18. More specifically, the value specified in the cache flush modifier field 74 indicates to the controller 18, the time interval to use for cache flushing if the "begin demand flush" threshold (discussed further below) is not reached. The parameter specified in the cache flush modifier field 74 is selected by the host computer 10 to optimize the performance of the host computer 10 when executing a particular software application. The host-selectable cache flush modifier parameter indirectly specifies the amount of time that unwritten write request data is to remain in the cache memory 33. The parameter ranges from zero (0) to fifteen (15), where zero (0) means that the unwritten write request data is to be written as soon as possible, and fifteen (15) means that the unwritten write request data can remain in the cache memory 33 at least until another host write request demands the use of cache memory 33.

If the cache flush modifier parameter is set to zero (0), then immediate cache flushing is indicated. Thus, the controller 18 will write the unwritten write request data to the disk array 26 as soon as possible if not immediately. This may provide the best response time since the amount of dirty data stored in the cache memory 33 will be kept at a minimum, thereby allowing cache memory 33 to be allocated quickly for new write request data. However, since dirty data will be retained in the cache memory 33 for a shorter period of time, fewer cache write hits (overwriting existing write request data stored in memory) will occur, and there will be less opportunity for concatenation and grouping of I/O requests thus causing more I/O accesses to the disk array 26 which degrades the performance of certain RAID levels. At a system shutdown and subsequent power down, all dirty data is quickly written to storage media, and battery 35 can be turned off thereby extending the battery life.

If the cache flush modifier parameter is set to fifteen (15), then the controller 18 will write the dirty or unwritten write request data to storage media only when there is a cache demand for new write request data. This may provide the lowest response time since dirty data stored in the cache memory 33 will be kept at a maximum, thereby causing new write requests to wait until other write request data has been written to storage media. Since dirty data will be retained in the cache memory 33 for a longer period of time, more cache write hits (overwrites) will occur and there will be more opportunities for concatenation and grouping of I/O requests thus causing fewer I/O accesses to storage media which improves the performance of certain RAID levels. At system shutdown and subsequent power down, the dirty write request data remains in cache, thus the battery 35 must be used to preserve the data thereby reducing battery life.

Figure 3A:
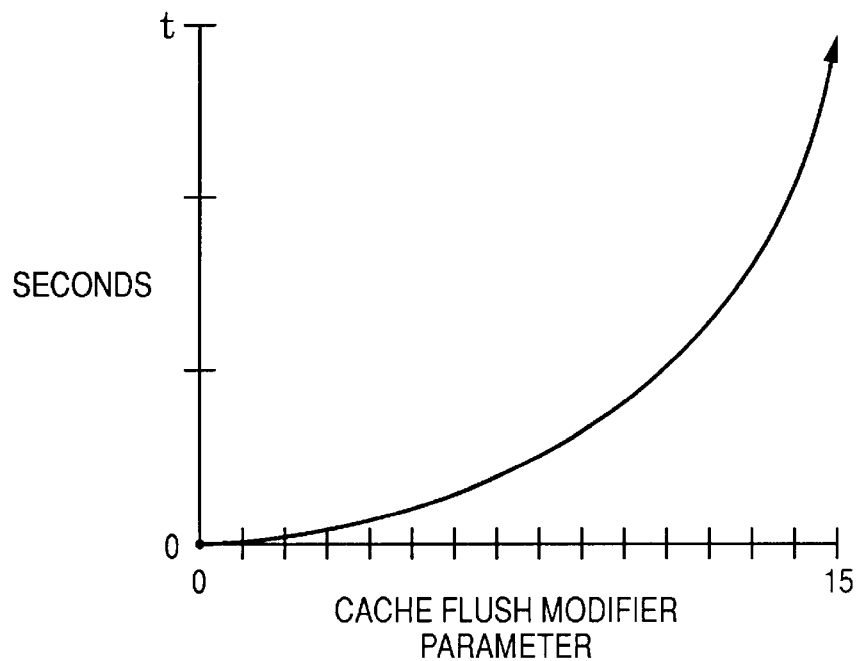
FIGS. 3A and 3B are graphs illustrating exemplary relationships between a range of host-selectable cache flush modifiers and corresponding time intervals for flushing a cache memory.
Figure 3B:
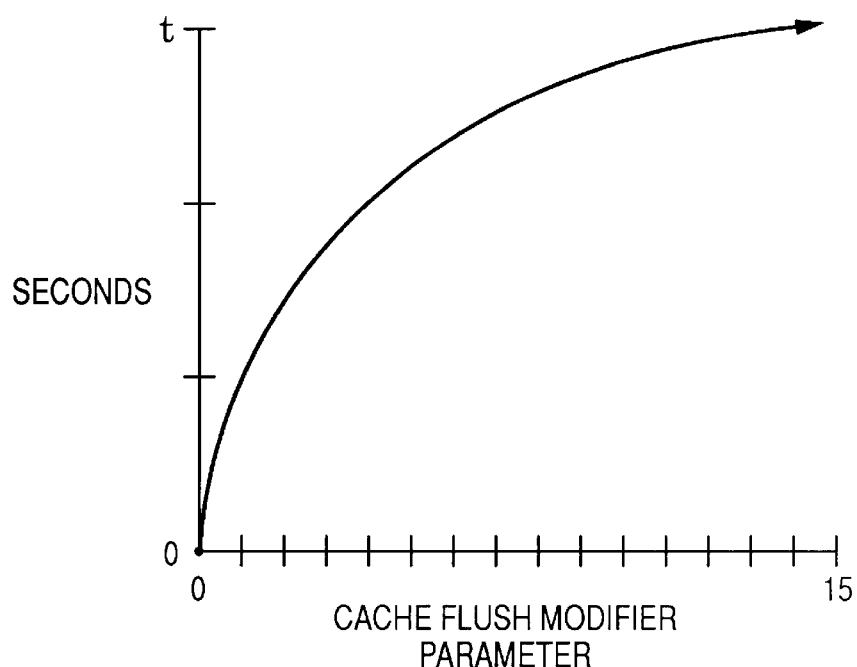

If the cache flush modifier parameter is set between zero (0) and fifteen (15), then schedule-driven cache flushing is indicated. That is, the controller 18 will flush the cache memory 33 in accordance with a particular time interval that is a function of the selected cache flush modifier parameter as shown in FIGS. 3A and 3B. The cache flushing time interval could relate exponentially to the cache flush parameter as shown in FIG. 3A, or could level out relative to the cache flush modifier parameter as shown in FIG. 3B. Alternatively, the time interval could relate linearly to the cache flush modifier parameter. Thus, it should be appreciated that the time interval values shown in FIGS. 3A and 3B are only exemplary and can be modified accordingly. Further, it should be appreciated that each time interval vs. modifier relationship can be implement by a different cache flushing algorithm, and the different cache flushing algorithms can be selected in the cache flush algorithm field 72. The cache flush modifier parameter is selectable on a per logical unit basis regardless of how the logical units are configured. Thus, if the controller 18 defines a number of logical units, each logical unit can have a different cache flushing modifier associated therewith.

The value specified in the two-minute warning flush algorithm field 76 is used to select a cache flushing algorithm to use when a UPS two-minute warning is received. The value specified in the two-minute warning flush modifier field 78 is used to provide cache flushing parameters to the controller 18 when a UPS two-minute warning is received. The two-minute warning flush modifier value indicates to the controller 18 the time interval to use for cache flushing if the "begin demand flush" threshold (discussed further below) is not reached. More specifically, the controller 18 uses the two-minute warning flush modifier parameter to select a time interval to use for cache flushing as described above with regard to the cache flush modifier parameter in field 74.

Two additional host-selectable fields are used to implement demand cache flushing, namely, the demand flush threshold field 80 and the demand flush amount field 82. The parameters specified in fields 80 and 82 are selectable on a global basis. In particular, if the controller 18 defines a number of logical units, then the demand cache flush parameters specified in fields 80 and 82 apply to each of the logical units.

As shown in FIG. 4, the demand flush threshold field 80 defines a selectable "begin demand flush" threshold 75 at which the controller 18 will begin to flush the cache memory 33. The "begin demand flush" threshold 75 represents a particular amount of dirty data that is stored in the cache memory 33. The "begin demand flush" threshold 75 is defined as a certain percentage of a "dirty maximum" threshold 77, where the "dirty maximum" threshold 77 is a non-selectable, configuration-specific threshold that is governed by the amount of cache memory 33 that is allocated for storing dirty or unwritten write request data. The "begin demand flush" threshold 75 is specified as a ratio using 255 as the denominator and the value in field 80 as the numerator.

The demand flush amount field 82 defines a "end demand flush" threshold 79 at which the controller 18 will stop flushing the cache memory 33. The "end demand flush" threshold 79 represents a particular amount or level of dirty data that will remain stored in the cache memory 33 after the controller 18 stops flushing the cache memory 33. Once demand cache flushing begins, it will continue until the amount of dirty data stored in cache memory 33 falls below the "end demand flush" threshold 79. Thus, the demand flush amount field 82 defines, in effect, the amount of dirty data that will be flushed by the controller 18 when a demand flush of dirty data occurs. The "end demand flush" threshold 79 is defined as a certain percentage of the "begin demand flush" threshold 75, and is specified as a ratio using 255 as the denominator and the value in field 82 as the numerator.

In view of the foregoing, it should be appreciated that the cache memory 33 can be independently flushed based upon (1) the age of the dirty data stored in the cache memory 33 which is set by the cache flush modifier parameter in field 74, and (2) the percentage of dirty cache stored in the cache memory 33 which is set by the "begin on-demand flush" threshold parameter in field 80 and the "end on-demand flush" threshold parameter in field 82. Thus, it is possible that the cache memory 33 could fill-up with dirty data faster than the dirty data could age so that on-demand caching would take-over and flush the cache memory 33. Likewise, it is possible that the cache memory would not fill-up with dirty data faster that the dirty data could age so that schedule driven caching would take over to flush the cache memory 33.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A method for transferring data to a storage medium, comprising the steps of:

providing a controller having a cache memory;

generating a cache-flushing parameter in a host computer;

transferring the cache-flushing parameter from the host computer to the controller;

writing a quantity of write request data from the cache memory of the controller to the storage medium in accordance with the cache-flushing parameter, initiating the writing step when an amount of unwritten write request data stored in the cache memory exceeds a first predetermined threshold value derived from the cache-flushing Parameter; and terminating the writing step when the amount of unwritten write request data drops below a second predetermined threshold value derived from another cache-flushing parameter.

2. The method of claim 1, wherein the writing step includes the step of:

writing the write request data to the storage media after elapse of a time interval derived from the cache-flushing parameter.

3. The method of claim 1, wherein the writing step includes the steps of:

determining a time interval value from the cache-flushing parameter; and writing the write request data to the storage media after elapse of the time interval.

4. The method of claim 1, further comprising the steps of:

generating a second cache-flushing parameter in the host computer;

transferring the second cache-flushing parameter from the host computer to the controller;

detecting a low battery condition; and writing a second quantity of write request data from the cache memory of the controller to the storage medium in accordance with the second cache-flushing parameter in response to the detecting step.

5. The method of claim 4, wherein:

said controller includes a memory buffer, said first cache-flushing parameter is stored in said memory buffer at a first location, and said second cache-flushing parameter is stored in said memory buffer at a second location which is different from said first location.

6. The method of claim 5, wherein said first cache-flushing parameter and said second cache-flushing parameter are simultaneously stored in said memory buffer.

7. A method of transferring data from a host computer to a storage media, comprising the steps of:

sending a first caching parameter which defines a first caching strategy to a controller;

transferring a first quantity of data from the host computer to the storage media based on the first caching parameter;

sending a second caching parameter which defines a second caching strategy to the controller;

transferring a second quantity of data from the host computer to the storage media based on the second caching parameter;

initiating the first quantity transferring step when an amount of unwritten write request data stored in the cache memory exceeds a first predetermined threshold value derived from the first cache-flushing parameter; and terminating the first quantity transferring step when the amount of unwritten write request data drops below a second predetermined threshold value derived from another cache flushing parameter associated with the cache memory.

8. The method of claim 7, wherein:

the first caching parameter sending step includes the step of storing the first caching parameter in a buffer in the controller; and the second caching parameter sending step includes the step of overwriting the first caching parameter with the second caching parameter in the buffer.

9. A method for transferring data to a storage device, comprising the steps of:

updating a cache-flushing parameter associated with a cache memory;

flushing the cache memory to the storage device in accordance with the cache flushing parameter after the updating step;

initiating the flushing step when an amount of unwritten write request data stored in the cache memory exceeds a first predetermined threshold value derived from the cache-flushing parameter; and terminating the flushing step when the amount of unwritten write request data drops below a second predetermined threshold value derived from another cache flushing parameter associated with the cache memory.

10. The method of claim 9, wherein the flushing step includes the step of:

flushing the cache memory at a time interval derived from the cache-flushing parameter.

11. The method of claim 9, wherein the flushing step includes the steps of:

determining a time interval value from the cache-flushing parameter; and flushing the cache memory in accordance with the time interval value.

12. The method of claim 9, wherein the updating step includes the steps of:

generating the cache-flushing parameter in a host computer; and sending the cache-flushing parameter to a controller.

13. The method of claim 12, wherein the updating step further includes the step of:

storing the cache-flushing parameter in a buffer of the controller.

14. A method for controlling cache flushing characteristics of a storage device, with the storage device having a controller which includes a cache memory, comprising the steps of:

sending a cache-flushing parameter to the controller;

flusning the cache memory of the controller in accordance with the cache-flushing parameters initiating the flushing step when an amount of unwritten write request data stored in the cache memory exceeds a first predetermined threshold value derived from the cache-flushing parameter; and terminating the flushing step when the amount of unwritten write request data drops below a second predetermined threshold value derived from another cache-flushing parameter.

15. The method of claim 14, wherein the flushing step includes the step of:

flushing the cache memory at a time interval derived from the cache-flushing parameter.

16. The method of claim 14, wherein the flushing step includes the steps of:

determining a time interval value from the cache-flushing parameter; and flushing the cache memory in accordance with the time interval value.

17. The method of claim 14, further comprising the steps of:

generating the cache-flushing parameter in a host device before the sending step; and storing the cache-flushing parameter in a buffer of the controller after the sending step.

18. A program storage device readable by a machine, tangibly embodying a program or instructions executable by the machine to perform method steps for transferring data to a storage medium, said method steps comprising:

providing a controller having a cache memory;

generating a cache-flushing parameter in a host computer;

transferring the cache-flushing parameter from the host computer to the controller;

writing a quantity of write request data from the cache memory of the controller to the storage medium in accordance with the cache-flushing parameter;

initiating the writing step when an amount of unwritten write request data stored in the cache memory exceeds a first predetermined threshold value derived from the cache-flushing parameter; and terminating the writing step when the amount of unwritten write request data drops below a second predetermined threshold value derived from another cache-flushing parameter.

* * * * *